US012618334B2

(12) United States Patent
Rauschmeier et al.

(10) Patent No.: US 12,618,334 B2
(45) Date of Patent: May 5, 2026

(54) STATOR VANE ASSEMBLY OF A TURBOMACHINE AND METHOD FOR ASSEMBLING A STATOR VANE ASSEMBLY

(71) Applicant: MTU Aero Engines AG, Munich (DE)

(72) Inventors: Alexander Rauschmeier, Soechtenau (DE); Christian Roth, Munich (DE); Thomas Stiftner, Munich (DE); Ralf Huber, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/796,547

(22) Filed: Aug. 7, 2024

(65) Prior Publication Data

US 2025/0052169 A1 Feb. 13, 2025

(30) Foreign Application Priority Data

Aug. 8, 2023 (DE) ......................... 102023121106.4

(51) Int. Cl.
*F01D 17/12* (2006.01)

(52) U.S. Cl.
CPC .......... *F01D 17/12* (2013.01); *F05D 2220/32* (2013.01); *F05D 2230/60* (2013.01); *F05D 2240/12* (2013.01)

(58) Field of Classification Search
CPC .......... F01D 9/04; F01D 17/16; F01D 17/162; F01D 17/165
See application file for complete search history.

(56) References Cited

U.S. PATENT DOCUMENTS

| | | | |
|---|---|---|---|
| 4,792,277 A | 12/1988 | Drittberner et al. | |
| 5,143,383 A | 9/1992 | Glynn et al. | |
| 5,364,543 A | 11/1994 | Bosna et al. | |
| 5,636,968 A | 6/1997 | Audet et al. | |
| 6,129,512 A | 10/2000 | Agram et al. | |
| 6,334,617 B1 | 1/2002 | Putnam et al. | |
| 6,413,043 B1 | 7/2002 | Bouyer | |
| 6,478,304 B1 | 11/2002 | Hoffelner | |
| 6,767,183 B2 * | 7/2004 | Schilling | F04D 29/083 415/230 |

(Continued)

FOREIGN PATENT DOCUMENTS

| | | |
|---|---|---|
| DE | 3874439 T2 | 2/1993 |
| DE | 3413628 C2 | 9/1996 |

(Continued)

*Primary Examiner* — Christopher R Legendre
(74) *Attorney, Agent, or Firm* — Davidson Kappel LLC

(57) ABSTRACT

A stator vane assembly (10) and a method for assembling a stator vane assembly (10) of a turbomachine, the stator vane assembly (10) including a plurality of variable stator vanes (11) whose stator vane platform (12) has a stator vane trunnion (13) that is mounted in a receiving opening (14) of a casing (15) of the turbomachine; a stator vane head (16) of the stator vane (11) having a bearing trunnion that is mounted on an inner ring (19) disposed on a rotor (119) of the turbomachine. In the method, a stator vane trunnion (13) disposed on a stator vane platform (12) of a stator vane (11) is inserted into a receiving opening (14) of a casing (15), which receiving opening (14) is disposed radially with respect to a rotor axis of the turbomachine, and an inner ring (19) is provided on a rotor (119) of the turbomachine.

19 Claims, 8 Drawing Sheets

(56) References Cited

U.S. PATENT DOCUMENTS

| | | | | |
|---|---|---|---|---|
| 6,860,483 | B2 | 3/2005 | McCutchan | |
| 7,104,754 | B2 | 9/2006 | Willshee et al. | |
| 7,163,369 | B2 | 1/2007 | Bruce et al. | |
| 7,238,001 | B2 | 7/2007 | Rushton et al. | |
| 7,445,213 | B1 | 11/2008 | Pelfrey et al. | |
| 7,445,427 | B2 * | 11/2008 | Gutknecht | F04D 29/563 415/160 |
| 7,614,846 | B2 * | 11/2009 | Foucher | F01D 17/162 415/161 |
| 7,685,712 | B2 * | 3/2010 | Foucher | B23P 6/007 29/889.6 |
| 8,038,387 | B2 * | 10/2011 | Houradou | F04D 29/057 384/215 |
| 8,162,597 | B2 | 4/2012 | Lejars et al. | |
| 8,318,251 | B2 | 11/2012 | Cavanaugh et al. | |
| 8,579,581 | B2 | 11/2013 | Tallman et al. | |
| 9,057,279 | B2 | 6/2015 | Lotfi et al. | |
| 9,982,688 | B2 | 5/2018 | Wang et al. | |
| 10,001,024 | B2 | 6/2018 | Schuster et al. | |
| 10,107,122 | B2 | 10/2018 | Maliniak et al. | |
| 10,167,729 | B2 | 1/2019 | Aiello et al. | |
| 10,202,859 | B2 | 2/2019 | Biemar | |
| 10,253,646 | B2 | 4/2019 | Pudvah et al. | |
| 10,273,967 | B2 | 4/2019 | Scholtes et al. | |
| 10,280,941 | B2 | 5/2019 | Mouton et al. | |
| 10,287,902 | B2 * | 5/2019 | Sak | F01D 9/041 |
| 10,385,872 | B2 | 8/2019 | Hugon et al. | |
| 10,450,963 | B2 | 10/2019 | Raper et al. | |
| 10,494,944 | B2 | 12/2019 | Humhauser et al. | |
| 10,662,805 | B2 | 5/2020 | Edynak et al. | |
| 10,662,814 | B2 | 5/2020 | Maliniak et al. | |
| 10,746,041 | B2 | 8/2020 | Patel et al. | |
| 10,753,393 | B2 | 8/2020 | Scothern | |
| 10,774,670 | B2 | 9/2020 | Mathew et al. | |
| 10,794,210 | B2 | 10/2020 | Novikov et al. | |
| 10,830,090 | B2 | 11/2020 | Mairhanser | |
| 10,830,155 | B2 | 11/2020 | Little et al. | |
| 10,858,950 | B2 | 12/2020 | Shi et al. | |
| 10,858,959 | B2 | 12/2020 | Maar | |
| 10,876,425 | B2 | 12/2020 | Humhauser | |
| 10,900,371 | B2 | 1/2021 | Shi et al. | |
| 10,954,808 | B2 | 3/2021 | Kuwamura et al. | |
| 10,975,711 | B2 | 4/2021 | Kuwamura et al. | |
| 10,975,716 | B2 | 4/2021 | Scholtes et al. | |
| 10,982,558 | B2 * | 4/2021 | Mairhanser | F01D 9/041 |
| 11,149,571 | B2 | 10/2021 | Delahaye et al. | |
| 11,215,066 | B2 | 1/2022 | Telman et al. | |
| 11,280,210 | B2 | 3/2022 | Albers | |
| 11,319,825 | B2 | 5/2022 | Ozaki et al. | |
| 11,428,113 | B2 | 8/2022 | Ganiger et al. | |
| 11,512,713 | B2 | 11/2022 | Vyvey | |
| 11,549,388 | B2 | 1/2023 | Faisal et al. | |
| 2002/0145258 | A1 | 10/2002 | Nava et al. | |
| 2003/0113204 | A1 | 6/2003 | Wolf | |
| 2005/0232756 | A1 | 10/2005 | Cormier et al. | |
| 2006/0056963 | A1 | 3/2006 | Abadie et al. | |
| 2006/0078420 | A1 | 4/2006 | Barbe et al. | |
| 2007/0274825 | A1 | 11/2007 | De Martino | |
| 2008/0031729 | A1 | 2/2008 | Bouru et al. | |
| 2009/0058013 | A1 | 3/2009 | Bulgrin et al. | |
| 2009/0091088 | A1 | 4/2009 | Berendt | |
| 2009/0317228 | A1 | 12/2009 | Werner | |
| 2011/0070074 | A1 | 3/2011 | Schabowski et al. | |
| 2011/0243714 | A1 | 10/2011 | Saxer et al. | |
| 2011/0286851 | A1 | 11/2011 | Benkler et al. | |
| 2011/0293406 | A1 | 12/2011 | Abadie et al. | |
| 2012/0134787 | A1 | 5/2012 | Hiernaux | |
| 2013/0129494 | A1 | 5/2013 | Duchaine et al. | |
| 2013/0175325 | A1 | 7/2013 | Lin et al. | |
| 2014/0044526 | A1 | 2/2014 | Humhauser | |
| 2014/0140822 | A1 * | 5/2014 | Capozzi | F04D 29/526 415/160 |
| 2014/0252721 | A1 | 9/2014 | Gore | |
| 2014/0255183 | A1 | 9/2014 | Kraus et al. | |
| 2015/0030438 | A1 | 1/2015 | Takahashi et al. | |
| 2015/0078893 | A1 | 3/2015 | Schmid et al. | |
| 2015/0132124 | A1 | 5/2015 | Albers et al. | |
| 2015/0139786 | A1 | 5/2015 | Werner et al. | |
| 2015/0275683 | A1 | 10/2015 | Humhauser et al. | |
| 2016/0146027 | A1 | 5/2016 | Humhauser et al. | |
| 2016/0237855 | A1 | 8/2016 | Humhauser et al. | |
| 2016/0238028 | A1 | 8/2016 | Humhauser et al. | |
| 2016/0377087 | A1 | 12/2016 | Jakimov et al. | |
| 2017/0159467 | A1 * | 6/2017 | Albers | F01D 9/041 |
| 2017/0370238 | A1 | 12/2017 | Geppert et al. | |
| 2018/0003065 | A1 | 1/2018 | Collado | |
| 2018/0112555 | A1 | 4/2018 | Humhauser | |
| 2019/0048454 | A1 | 2/2019 | Schuster | |
| 2019/0093499 | A1 | 3/2019 | Sippel et al. | |
| 2019/0106999 | A1 | 4/2019 | Jarossay et al. | |
| 2019/0277148 | A1 | 9/2019 | Albers | |
| 2020/0056499 | A1 | 2/2020 | Stiehler | |
| 2020/0063589 | A1 | 2/2020 | Laroche et al. | |
| 2020/0277871 | A1 | 9/2020 | Shi et al. | |
| 2023/0151773 | A1 | 5/2023 | Rohling et al. | |
| 2025/0052169 | A1 * | 2/2025 | Rauschmeier | F01D 17/12 |

FOREIGN PATENT DOCUMENTS

| | | | |
|---|---|---|---|
| DE | 10225679 | A1 | 12/2003 |
| DE | 10348290 | A1 | 5/2005 |
| DE | 60209825 | T2 | 12/2006 |
| DE | 60027258 | T2 | 1/2007 |
| DE | 102005042747 | A1 | 3/2007 |
| DE | 102007004743 | A1 | 8/2008 |
| DE | 102007015669 | A1 | 10/2008 |
| DE | 102008044471 | A1 | 3/2009 |
| DE | 102008019890 | A1 | 10/2009 |
| DE | 102009034025 | A1 | 1/2011 |
| DE | 102009042857 | A1 | 3/2011 |
| DE | 102009055913 | A1 | 6/2011 |
| DE | 102009038623 | B4 | 1/2012 |
| DE | 102013203870 | B4 | 6/2015 |
| DE | 102005048814 | B4 | 3/2017 |
| DE | 102016211337 | A1 | 12/2017 |
| DE | 112016002476 | T5 | 2/2018 |
| DE | 102017204243 | A1 | 9/2018 |
| DE | 112017000843 | T5 | 10/2018 |
| DE | 102018203442 | A1 | 9/2019 |
| DE | 102018210513 | A1 | 1/2020 |
| DE | 102018213983 | A1 | 2/2020 |
| EP | 1205639 | A1 | 5/2002 |
| EP | 1288443 | B1 | 5/2005 |
| EP | 1108857 | B1 | 4/2006 |
| EP | 1114241 | B1 | 6/2006 |
| EP | 102005030426 | A1 | 1/2007 |
| EP | 1205638 | B1 | 7/2007 |
| EP | 1887188 | B1 | 9/2009 |
| EP | 1319844 | B1 | 12/2009 |
| EP | 1635039 | B1 | 9/2010 |
| EP | 1586744 | B1 | 12/2010 |
| EP | 1111194 | B1 | 8/2011 |
| EP | 2356319 | A1 | 8/2011 |
| EP | 1967718 | B1 | 6/2013 |
| EP | 1878876 | B1 | 12/2013 |
| EP | 2048327 | B1 | 12/2013 |
| EP | 2372093 | B1 | 12/2013 |
| EP | 2 829735 | A1 | 1/2015 |
| EP | 2418387 | B1 | 4/2015 |
| EP | 2884055 | A1 | 6/2015 |
| EP | 1705341 | B1 | 8/2015 |
| EP | 2458157 | B1 | 10/2015 |
| EP | 2871325 | B1 | 4/2016 |
| EP | 3032037 | A1 | 6/2016 |
| EP | 1757776 | B1 | 8/2016 |
| EP | 3051073 | A1 | 8/2016 |
| EP | 2093380 | B1 | 1/2017 |
| EP | 2955335 | B1 | 8/2017 |
| EP | 2716874 | B1 | 12/2017 |
| EP | 2851519 | B1 | 1/2018 |
| EP | 2873811 | B1 | 1/2018 |
| EP | 3086005 | B1 | 1/2018 |
| EP | 2894300 | B1 | 5/2018 |

(56) References Cited

FOREIGN PATENT DOCUMENTS

| | | | |
|---|---|---|---|
| EP | 2964982 | B1 | 5/2018 |
| EP | 3056683 | B1 | 5/2018 |
| EP | 3056684 | B1 | 5/2018 |
| EP | 3315728 | A1 | 5/2018 |
| EP | 2169026 | B1 | 9/2018 |
| EP | 2375002 | B1 | 10/2018 |
| EP | 3230602 | B1 | 11/2018 |
| EP | 2261467 | B1 | 1/2019 |
| EP | 2738356 | B1 | 5/2019 |
| EP | 3056687 | B1 | 6/2019 |
| EP | 3502422 | A1 | 6/2019 |
| EP | 3101237 | B1 | 7/2019 |
| EP | 2696041 | B1 | 1/2020 |
| EP | 3239466 | B1 | 1/2020 |
| EP | 3333374 | B1 | 1/2020 |
| EP | 2952690 | B1 | 3/2020 |
| EP | 3392464 | B1 | 3/2020 |
| EP | 2317079 | B1 | 5/2020 |
| EP | 3109520 | B1 | 5/2020 |
| EP | 3444443 | B1 | 7/2020 |
| EP | 2834501 | B1 | 9/2020 |
| EP | 3524778 | B1 | 9/2020 |
| EP | 2612951 | B1 | 10/2020 |
| EP | 3728796 | A1 | 10/2020 |
| EP | 2937437 | B2 | 11/2020 |
| EP | 3036407 | B1 | 11/2020 |
| EP | 3460196 | B1 | 11/2020 |
| EP | 3290656 | B1 | 9/2021 |
| EP | 3680453 | B1 | 12/2021 |
| EP | 4030039 | A1 | 7/2022 |
| EP | 4180635 | | 5/2023 |
| FR | 2893357 | B1 | 5/2011 |
| FR | 2904669 | B1 | 5/2012 |
| FR | 2897120 | B1 | 10/2012 |
| FR | 2966530 | B1 | 11/2012 |
| FR | 3055353 | B1 | 9/2018 |
| FR | 3071541 | B1 | 9/2019 |
| FR | 3053386 | B1 | 3/2020 |
| FR | 3108369 | B1 | 10/2022 |
| GB | 2138892 | A | 10/1984 |
| JP | H1151200 | A | 2/1992 |
| JP | H10317911 | A | 12/1998 |
| JP | 5374563 | B2 | 12/2013 |
| JP | 6785041 | B2 | 11/2020 |
| WO | WO9606267 | A1 | 2/1996 |
| WO | WO2013075954 | A1 | 5/2013 |
| WO | WO2019013665 | A1 | 1/2019 |
| WO | WO2019074389 | A1 | 4/2019 |

* cited by examiner

STATOR VANE ASSEMBLY OF A TURBOMACHINE AND METHOD FOR ASSEMBLING A STATOR VANE ASSEMBLY

This claims priority to German Patent Application 102023121106.4, filed on Aug. 8, 2023, which is hereby incorporated by reference herein.

The invention relates to a stator vane assembly of a turbomachine including a plurality of variable stator vanes whose stator vane platform has a stator vane trunnion that is mounted in a receiving opening of a casing of the turbomachine, and further relates to a method for assembling a stator vane assembly.

BACKGROUND

A turbomachine includes, in serial flow arrangement, a compressor, a combustor, and a turbine. Air enters the turbomachine and is pressurized in the compressor. The compressed air is then mixed with fuel in the combustor. Hot combustion gases are produced when the mixture of compressed air and fuel is subsequently burned in the combustor. The hot combustion gases flow downstream to the turbine, which extracts energy from the combustion gases to drive the compressor.

SUMMARY OF THE INVENTION

Both the compressor and the turbine of a turbomachine usually include a plurality of stages, each stage having a row of stationary stator vanes and a row of rotating rotor blades. The stationary stator vanes direct the gas flow in such a way that it meets the rotating rotor blades at a predetermined angle. The stator vanes may be rotatable about their longitudinal axes to permit adjustment of the angle of attack. Such stator vanes are typically mounted at their radially inner ends on a stationary inner ring, whereby spoke-type centering of the assembly is provided. This creates a degree of freedom of the inner ring relative to the rotor of the turbomachine, whereby a necessary play is created between these components of the turbomachine. The radially outer ends of the variable stator vanes are usually mounted on the casing of the turbomachine so as to be rotatable about their, in particular radially oriented, longitudinal axes. Since typically a plurality of components are mounted on the inner ring in a narrow installation space, complex inner ring designs are sometimes required, which impair the stability and/or inherent stiffness of the inner ring and thus also the continuity of a sealing gap of the turbomachine.

In view of the above, it is an object of the present invention to provide an improved stator vane assembly of a turbomachine as well as an improved turbomachine. Another object is to provide an improved method for assembling a stator vane assembly and for assembling a flow assembly of a turbomachine. This is achieved in accordance with the invention by the teaching of the independent claims. Advantageous embodiments of the invention are the subject matter of the dependent claims.

The present invention provides a stator vane assembly of a turbomachine, the stator vane assembly including a plurality of variable stator vanes. The stator vane platform of a stator vane has a stator vane trunnion, which is mounted in a receiving opening of a casing of the turbomachine, which receiving opening is disposed in particular radially with respect to a rotor axis of the turbomachine. A stator vane head of the stator vane has a bearing trunnion, which is mounted on an inner ring disposed on a rotor of the turbomachine. Each stator vane is supported against the casing by means of a respective support device disposed in the receiving opening. The support device includes at least one first support element and at least one second support element, the second support element supporting the first support element within the receiving opening on the casing radially with respect to a rotor axis of the turbomachine.

The support device reduces, in particular prevents, relative movement of the stator vanes with respect to the casing, in particular in a longitudinal direction of the stator vane, and in particular of a plurality of stator vanes with respect to one another. This makes it possible to reduce load placed on the inner ring as a result of relative movement of the stator vane(s), which firstly allows for a simplified design of the inner ring and secondly facilitates the assembly of the stator vane assembly due to a simplified design of the inner ring.

The support elements may be configured and/or disposed in the receiving opening in such a way that they form a support device or support the stator vanes against the casing. For example, the first support element and the second support element may be configured or interact in such a way that they, in particular each, surround the stator vane trunnion radially at least partially, in particular completely. The first support element and the second support element may rest against each other. In particular, both support elements are designed to rest against the casing, i.e., against the inner periphery of the receiving opening, also in the axial direction and/or in the circumferential direction so as to support the stator vane or the stator vane trunnion and/or the stator vane platform. The support elements may be insertable into the receiving opening individually and/or independently of each other, which further simplifies the assembly of the stator vane assembly.

A turbomachine has a casing (stator) permitting axial flow therethrough and having mounted thereto a plurality of stator vanes, in particular a plurality of stator vanes arranged adjacent to one another in the circumferential direction and radially to an axis of rotation of the turbomachine, in particular in a spoke-centered manner. In an embodiment of the invention, the casing may be formed in one piece in particular also circumferentially, which enables a more uniform thermal expansion of the casing and, thus, an improved rotor-to-stator clearance behavior.

The stator vane extends in particular radially with respect to an axis of rotation of the turbomachine and is provided at its end directed toward the rotor of the turbomachine with the stator vane head, which is mounted on the inner ring. To this end, the stator vane head has a bearing trunnion, which is received by and rotatably held in a bearing seat disposed on the inner ring, in particular at the periphery thereof. The inner ring is configured to coaxially surround the rotor and to connect the stator vanes of the stator vane assembly to one another in order to stabilize the stator vane assembly and to achieve suitable vibration characteristics of the stator vane assembly. Arranged on the inner ring is a sealing device, which serves to seal a sealing gap formed between the inner ring and the opposite peripheral surfaces of the rotor. At its radially inner surface facing the rotor, the inner ring may have, for example, a radially outer portion of a labyrinth seal, which, together with a radially inner portion disposed on the opposite, radially outer surface of the rotor, forms a labyrinth seal.

At an end of the stator vane trunnion located on the outer side of the casing, the stator vane may be connected to an actuating mechanism, in particular to an actuating lever, to permit varying the pitch thereof. The actuating mechanism allows the stator vane to be rotated, in particular through a predetermined angle, about its pitch change axis.

According to another aspect of the invention, there is provided a method for assembling a stator vane assembly of a turbomachine, the method including the following steps:

- disposing a first support element around a stator vane trunnion disposed on a stator vane platform of a stator vane;
- inserting the stator vane trunnion into a receiving opening of a casing, which receiving opening is disposed radially with respect to a rotor axis of the turbomachine;
- providing an inner ring on a rotor of the turbomachine;
- moving the stator vane trunnion out of the receiving opening until a bearing trunnion disposed on a stator vane head of the stator vane engages in a bearing seat disposed on the inner ring;
- disposing a second support element in the receiving opening so that the stator vane is supported against the casing in the radial direction of the turbomachine.

Because the stator vane is moved radially in the receiving opening, the assembly of the stator vane assembly is simplified, thereby permitting better utilization of the installation space in the turbomachine and a simplified design of the inner ring. In addition, the proposed method also permits the stator vane assembly to be mounted in a one-piece casing, and, therefore, the turbomachine can be made lighter and more economical.

Since the stator vane assembly is disposed rotationally symmetrically with respect to the axis of rotation of the rotor, the stator vanes can be mounted on the inner ring radially about the rotor. Furthermore, by using a casing-side mounting space for supporting the stator vanes, the inner ring can be made simpler in design. In a stator vane assembly according to the invention, it may be configured, for example, as a closed ring, in particular a one-piece ring, or may, for example, be composed of two half-rings, which can reduce the number of components to be assembled. In particular, the proposed method makes it possible to reduce the design complexity of the inner ring, and thus also enables a more cost-effective manufacture and assembly of the inner ring and other components of the turbomachine.

The proposed solution is based, among other things, on the idea of supporting a stator vane at its casing-side end in such a manner that the stator vane assembly can have sufficient stability in order to simplify the design of the inner ring. For this purpose, it is proposed to use each receiving opening to support a respectively associated stator vane individually therein.

The receiving opening extends continuously from an inner periphery of the casing to an outer periphery of the casing of the turbomachine. A receiving opening may be configured rotationally symmetrically about a radial of the turbomachine and may be bounded by the casing of the turbomachine. The support device may be configured to substantially completely fill the receiving opening or a space between the stator vane trunnion and the receiving opening, at least in some regions or portions thereof, so as to provide support for the stator vane. In particular, the support device is configured to at least partially embrace the stator vane trunnion, in particular axially, so as to support the stator vane in particular also in the axial direction of the stator vane trunnion. In this way, the stator vane is supported in particular in a substantially play-free manner with respect to the casing. The support device is also configured to at least partially rest against the casing radially with respect to the stator vane trunnion so as to allow forces to be introduced into the casing radially to the stator vane trunnion.

The proposed stator vane assembly and the proposed method for assembling a stator vane assembly allow a degree of freedom created by the receiving opening on the casing to be made use of when mounting the stator vanes on the inner ring, which improves the provision and accessibility of components, in particular of the stator vane assembly. This also allows for a simplified design and assembly of the inner ring. Moreover, the proposed stator vane assembly and its simplified assembly allows the casing and/or the inner ring of the turbomachine to be configured as undivided components. In addition, by eliminating connecting components for the casing or the inner ring, a reduction in weight and a generally more cost-effective design of the turbomachine are made possible.

In an embodiment of the stator vane assembly, the inner ring is one-piece or one-part in design or segmented in design. In the context of the disclosure, a one-piece or one-piece inner ring is formed as a ring which completely embraces the rotor and which is slip-fittable or slip-fitted axially around the rotor of the turbomachine. The inner ring is provided in particular at its periphery with a number of bearing seats, which are in particular oriented radially with respect to the turbomachine, and which are each configured to receive a bearing trunnion of a stator vane.

In an embodiment of the stator vane assembly, the inner ring may also take the form of a half-ring. In the context of the disclosure, a half-ring describes a semicircular arc and is formed in particular as a circular arc having an inner diameter and an outer diameter coaxial therewith, and having a central angle of 180° over the inner and/or outer diameter. In particular, the inner ring of the stator vane assembly is formed of two half-rings that complement each other to form a circumferential ring configured to completely coaxially surround the rotor. Such a design of the inner ring can increase the stability of the inner ring and/or of the stator vane assembly, which also makes it possible to stabilize and improve the sealing of a circumferential sealing gap of the turbomachine.

In an embodiment of the stator vane assembly, the casing is in particular circumferentially formed as one part. This makes it possible to improve the airtightness of the casing and, thus, of the turbomachine. Furthermore, the additional material of the flange surfaces results in non-uniform thermal properties over the circumference of the casing, which can adversely affect the radial clearances between the rotor and stator. In addition, a one-piece casing is simpler in design and thus also more economical to manufacture, especially because fastening elements, such as nuts and screws, required for connecting multiple casing parts can be dispensed with. In other embodiments, the casing may be assembled from two half-ring-shaped casing parts.

In an embodiment of the stator vane assembly, the support device may be configured to center a pitch change axis of the stator vane in the receiving opening. For this purpose, the support device may be configured to support the stator vane not only radially, but also axially and/or in the circumferential direction of the turbomachine, in particular relative to the casing thereof. By centering the vanes, it is also possible to reduce wear of the stator vane trunnion.

In an embodiment of the stator vane assembly, the receiving opening is circular in shape at its radially inner end portion and there has a diameter substantially equal to a diameter of the stator vane platform. The stator vane platform has a substantially circular outer contour, in particular perpendicular to a pitch change axis of the stator vane, in order to allow rotation about the pitch change axis. This allows the stator vane platform to be rotatably received and held in the casing, i.e., in the receiving opening, while at the same time allowing it to be supported in the radial direction. The proposed design, which provides for a support device that is disposed in the receiving opening, i.e., between the stator vane trunnion and the casing, and in particular is disposed around an end of the stator vane trunnion facing the stator vane platform, also makes it possible to improve the vibration resistance of the stator vane(s) and, thus, also of the stator vane assembly.

In some embodiments, the receiving opening may have at least two different diameters along its radial extent relative to the turbomachine. A radially outer diameter may be smaller than a radially inner diameter. The different diameters may form a stop for the stator vane trunnion, the stator vane platform, and/or a support element disposed thereon, the stop blocking radially outward movement of the stator vane during assembly.

In an embodiment of the stator vane assembly, at least two adjacent receiving openings are interconnected at their radially inner portions by a connecting opening in such a way that a portion of the stator vane can, in particular temporarily, be received in the connecting opening. This allows the stator vane to be moved farther toward the casing during assembly in order to increase the available space for mounting the inner ring. More particularly, when inserting the respective stator vane, it can be rotated or positioned in the receiving opening such that its airfoil is oriented in a circumferential direction of the turbomachine so that it can be received in the connecting opening.

In an embodiment of the stator vane assembly, the support device is configured to support at least one rotary bearing bush for the stator vane or the stator vane trunnion. A rotary bearing bush may be, for example, a radial bearing, a journal bearing or a radial plain bearing, a slide bushing and/or a hat bushing, which in particular prevents two degrees of freedom in the radial direction of its circular cross section. In some embodiments, a bearing bush is disposed between the stator vane trunnion and the receiving opening formed in the casing, which bearing bush supports the stator vane trunnion in particular such that it is rotatable about an axis of the stator vane trunnion, thus making it possible to vary the pitch of the variable stator vane. In addition, an axially acting slide bushing may be disposed between the stator vane platform and the support device, which slide bushing is configured to permit rotation of the stator vane, in particular of the stator vane platform, relative to the support device. The rotary bearing bush may form, or be, a component of the support device, in particular the first support element and/or the second support element.

In an embodiment of the stator vane assembly, the support device is locked in position in the receiving opening of the casing by means of a securing element. In some embodiments, the receiving opening may have a receiving groove for the securing element, in particular in the portion thereof opposite the stator vane platform in the longitudinal direction. The securing element may form, for example, the second support element and/or may be a part of the support device. In particular, the first support element and/or the support device are/is locked or secured in position by the securing element in such a way that it is disposed in the receiving opening in a fixed position radially with respect to turbomachine, especially during operation. For example, a securing element in the form of a retaining ring may be disposed or disposable at or in a suitably configured groove or a wall of the receiving opening, thus retaining the first support element or the support device in position. The securing element and the receiving opening or its groove may, for example, be configured to correspond with each other, so that an interlocking connection can be created between the securing element and receiving opening. This eliminates the need for additional positional fixation, in particular of a first support element or of the support device, which simplifies the assembly of the stator vane assembly.

In an embodiment of the stator vane assembly, the stator vane trunnion has a mounting groove in its portion opposite the stator vane platform. The mounting groove may be configured to provide a contact point for a tool, so that the stator vane trunnion or the stator vane can be moved in the receiving opening using the tool. This makes it possible, for example, to simplify disassembly of the stator vane assembly.

In an embodiment of the stator vane assembly, the second support element is a slide bushing for the stator vane trunnion. The slide bushing may be configured to support the stator vane trunnion with respect to the receiving opening formed in the casing such that it is rotatable about an axis of the stator vane trunnion and to thus make it possible to vary the pitch of the stator vane. The slide bushing may be disposed in the receiving opening and, in particular, be locked in position at or in the receiving opening of the casing by means of the or a securing element in such a manner that it supports the first support element in a radial direction. At least a portion or section of the slide bushing may extend into an enlarged diameter portion of the receiving opening.

In an embodiment, the first support element has at least one spacer element, which is configured to support at least one hat bushing for the stator vane platform and to support the hat bushing on the stator vane platform. The spacer element may be configured to be disposed around the stator vane trunnion and/or around the stator vane platform. More particularly, the spacer element may be configured to at least partially, in particular completely, embrace the stator vane trunnion and to support it with respect to an enlarged diameter of the receiving opening.

In an embodiment, the spacer element is configured to at least partially receive a slide bushing or a thrust washer, in particular in order to secure it in position with respect to the stator vane platform and/or to permit rotation of the stator vane about the pitch change axis or the stator vane trunnion. The so enabled securement of the thrust washer makes it possible to reduce wear.

In an embodiment of the stator vane assembly, the first support element is a sleeve element configured to at least partially embrace the stator vane trunnion. The sleeve element may be configured to support the stator vane trunnion such that it is rotatable about an axis of the stator vane trunnion relative to the receiving opening formed in the casing, in particular by means of at least one rotary bearing bush or slide bushing disposed in the sleeve element. The sleeve element may be disposed in the receiving opening and, in particular, be locked in position at or in the receiving opening of the casing by means of the or a securing element. The sleeve element may support the stator vane platform and/or a hat bushing disposed thereon in a direction radial to the turbomachine. This also allows the stator vane(s) to be supported in a space-saving and, thus, weight-saving manner.

In an embodiment of the stator vane assembly, the sleeve element is configured to support two rotary bearing bushes with respect to the stator vane. Here, the sleeve element may have a cross-sectional constriction, which may spatially separate the two rotary bearing bushes. In particular, such a sleeve element may be configured to support a slide bushing in the region of the stator vane trunnion or relative to the stator vane trunnion, and to support a hat bushing in the region of the stator vane trunnion or relative to the stator vane trunnion, and to thus permit rotation of the stator vane in the receiving opening. This also makes it possible to position a plurality of rotary bearings, thereby improving the stability of the stator vane and, thus, of the stator vane assembly.

In an embodiment of the stator vane assembly, a plurality of stator vanes may be arranged radially, in particular circumferentially, on the casing. Each stator may be supported against the casing by means of a respective support device.

In an embodiment, the movement of the stator vane trunnion out of the receiving opening may be effected from a radially outer portion of the receiving opening using a tool. This allows the stator vane trunnion or the stator vane to be moved, in particular through a predetermined distance, by the tool in order to speed up the assembly and/or make it more accurate.

In an embodiment, the disposition of the second support element and/or of the safety (securing) element may be effected from a radially outer portion of the receiving opening. In this case, in particular after the stator vane is moved out of the receiving opening and mounted on the inner ring (bearing trunnion engages in bearing seat), a first support element can be inserted into the mounting space and then locked in position by means of a second support element.

In an embodiment, the method includes a further step of disposing a securing element to lock the first support element and/or the second support element and/or the support device in position. The securing element may be inserted from a radially outer region into the receiving opening in order to be secured or locked in position therein. The securing element is in particular configured and/or positioned such that the first support element and/or the second support element or the support device are/is fixed in a direction radial to the rotor axis of the turbomachine. The first support element, the second support element, and/or the support device can thus be, in particular releasably, mounted in a fixed position in order to support the stator vane against the casing.

In an embodiment, the movement of the stator vane trunnion in and out of a receiving opening is effected along a pitch change axis of the stator vane disposed radially with respect to a rotor axis of the turbomachine. In the process, the stator vane is inserted into the installation space of the turbomachine, and the pitch change axis of the stator vane is aligned with the receiving opening formed in the casing. The stator vane trunnion is then inserted into the receiving opening, in particular until the surface of the stator vane platform facing the stator vane trunnion abuts against the casing. In this condition, the stator vane is located in a radially outer position, so that sufficient installation space is available radially inwardly of the stator vane to provide an inner ring on the rotor. During movement of the stator vane in or out of the receiving opening, it may, for example, be rotated through an angle of, in particular, about 90°, in particular to allow an airfoil of the stator vane to be moved, in particular temporarily, into the mounting space, whereby an installation space for providing the inner ring can be increased.

Once the inner ring is provided on the rotor and, in particular, located in the intended position, the stator vane can be moved out of the receiving opening along the pitch change axis until the bearing trunnion of the stator vane engages in a bearing seat disposed on the periphery of the inner ring and can be mounted thereon. The pitch change axis is in particular a central axis of the stator vane trunnion and, thus, also the axis of rotation of the stator vane, about which this stator vane or the stator vane airfoil is rotatable to obtain a desired angle of incidence of the air flow.

In an embodiment, the method includes a further step of connecting the stator vane trunnion to an actuating device. The actuating device is in particular configured to rotate the stator vane about its pitch change axis through a predetermined angle in order to direct a gas flow at a preferred angle of (or toward) an assembly of rotating rotor blades. The actuating device may be connected to the stator vane trunnion via an actuating lever. The actuating device is in particular configured to cooperate with a plurality of further actuating devices, which are connected to a plurality of stator vanes or stator vane trunnions of a stator vane assembly.

According to another aspect of the invention, there is provided a method for assembling a flow assembly of a turbomachine, the method including the following steps:

- providing a casing;
- disposing a first rotor blade assembly in the casing;
- assembling a first stator vane assembly in the casing in accordance with one or more aspects of the method described above; and
- disposing a second rotor blade assembly in the casing.

A flow assembly of a turbomachine forms in particular a compressor device or a turbine device and usually includes a plurality of stages. Each stage includes a stationary stator vane assembly and a rotating rotor blade assembly extending from a rotor hub. In particular, in the proposed method, there may be provided a single- or multi-piece casing which is formed, in particular, rotationally symmetrically about an axis of rotation of the turbomachine, and in which a first rotor blade assembly is mounted. In this connection, for example, first a plurality of stator vanes are disposed in and in particular also on the casing in such a way that a respective stator vane trunnion is inserted into a receiving opening of the casing, which receiving opening is disposed in particular radially with respect to the rotor axis of the turbomachine. Then, an inner ring is provided, in particular on the rotor, and the stator vane trunnion of the respective stator vane is moved out of the receiving opening toward the axis of rotation of the turbomachine until a bearing trunnion disposed on a stator vane head of the respective stator vane engages in a bearing seat disposed on the inner ring. The stator vane platform and the casing then together form a mounting space in which, in the next step, a support device is disposed so that it supports the stator vane(s) against the casing. In the next step, the support device may then be locked in position. In a further step, the stator vane trunnion of the respective stator vane may be connected to an actuating device.

In a further step of the proposed method for assembling a flow assembly, a second rotor blade assembly of the turbomachine, which rotor blade assembly rotates in particular together with the rotor, is disposed in the casing. In optional further steps, further stator vane assemblies and rotor blade assemblies may be alternately disposed, in particular as described above, to provide a flow assembly having a predetermined number of stages.

The described method for assembling a flow assembly makes it possible to simplify the assembly as compared to known methods because an installation space in the casing can be better utilized due to the in particular radial movement of the stator vane(s) into and out of the receiving opening(s), and, at the same time, by enabling a simplified design of an inner ring of the respective stator vane assembly and—in particular depending on further structures of the turbomachine—a one-piece design of the casing.

According to another aspect, there is provided a turbomachine which has at least one stator vane assembly as described herein, or which has a stator vane assembly or a flow assembly assembled according to a method as described herein. Such a turbomachine has the advantage that it can be simplified in terms of design and assembly, and at the same time be more economical to manufacture.

The disclosure relating to the described stator vane assembly is generally also applicable to a corresponding method for assembling a stator vane assembly, a flow assembly, or a corresponding turbomachine including one or more stator vane assemblies, and vice versa. The features of the various exemplary aspects and exemplary embodiments described above or below may be combined, unless stated explicitly otherwise.

The present disclosure further includes another stator vane assembly of a turbomachine having a plurality of stator vanes. The stator vane platform of a stator vane has a stator vane trunnion, which is mounted in a receiving opening of a casing of the turbomachine, which receiving opening is disposed in particular radially with respect to a rotor axis of the turbomachine. A stator vane head of the stator vane has a bearing trunnion mounted on an inner ring disposed on a rotor of the turbomachine. A support device is disposed in a mounting space formed between the casing and the stator vane platform, the support device supporting the stator vane against the casing. The support device has at least one first support element, which is at least substantially shaped as a ring segment, in particular as a half-ring.

The mounting space is formed in the casing, in particular circumferentially or continuously in the circumferential direction, so that the at least one first support element is insertable into the mounting space in a circumferential direction of the casing or of the turbomachine. The support device in particular has two first support elements, each one of the support elements being disposed adjacent to the respective stator vane trunnion in the axial direction of the turbomachine. This makes it possible to provide stable support and seating of the stator vane trunnion and, thus, of the stator vane on both sides.

The support device may have at least one spacer element configured to be disposed around the stator vane trunnion and/or around the stator vane platform. More particularly, the spacer element may be configured to at least partially, in particular completely, embrace the stator vane platform and to support it with respect to the casing and/or the support device. The stator vane platform has a substantially circular outer contour perpendicular to a pitch change axis of the stator vane in order to allow rotation about the pitch change axis. Because the spacer element encompasses the respective stator vane platform and, at the same time, can be positioned or supported with respect to the casing and/or the support device, it is possible for forces to be absorbed from the stator vanes.

The spacer element may be configured to at least partially receive a slide bushing or a thrust washer, in particular in order to secure it in position with respect to the stator vane platform and/or to permit rotation of the stator vane about the pitch change axis or the stator vane trunnion. The so enabled securement of the thrust washer makes it possible to reduce wear.

The spacer element may be substantially rectangular in cross section. In particular, two adjacent spacer elements are configured to support each other, in particular in the circumferential direction of the turbomachine, so as to support two adjacent stator vane platforms against each other and/or space them apart. The spacer element may have a substantially rectangular or square cross section, allowing it to be disposed between the support device, the casing, and the stator vane platform in the mounting space, and to assist in the supporting of two adjacent spacer elements against each other, in particular in the circumferential direction of the turbomachine, and in particular to cover or bound the mounting space. The spacer element may, for example, rest against a projection of the casing arranged in particular radially with respect to the stator vane trunnion, and may be held in position by the support device and/or a securing portion of the support device and/or the stator vane platform.

In addition, there is provided a method for assembling such a stator vane assembly of a turbomachine, the method including the steps of:

- inserting a stator vane trunnion disposed on a stator vane platform of a stator vane into a receiving opening of a casing, which receiving opening is disposed radially with respect to a rotor axis of the turbomachine;
- providing an inner ring on a rotor of the turbomachine;
- moving the stator vane trunnion out of the receiving opening until a bearing trunnion disposed on a stator vane head of the stator vane engages a bearing seat disposed on the inner ring, the stator vane platform and the casing together forming a mounting space;
- disposing a support device in the mounting space so that the stator vane is supported against the casing, at least a first support element of the support device being inserted into the mounting space in a circumferential direction of the turbomachine or of the casing; and
- locking the support device in position.

In this connection, the casing is in particular made up of at least two parts, so that the casing can be assembled after insertion of the first support device(s), which are/is in particular shaped as a half-ring. This makes it possible to simplify the assembly of the stator vane assembly. In this connection, it is also possible to better utilize an installation space in the turbomachine and to simplify the design of the inner ring.

BRIEF DESCRIPTION OF THE DRAWINGS

Further features, advantages, and possible applications of invention will be apparent from the following description taken in conjunction with the figures, in which.

DETAILED DESCRIPTION

Figure 1:
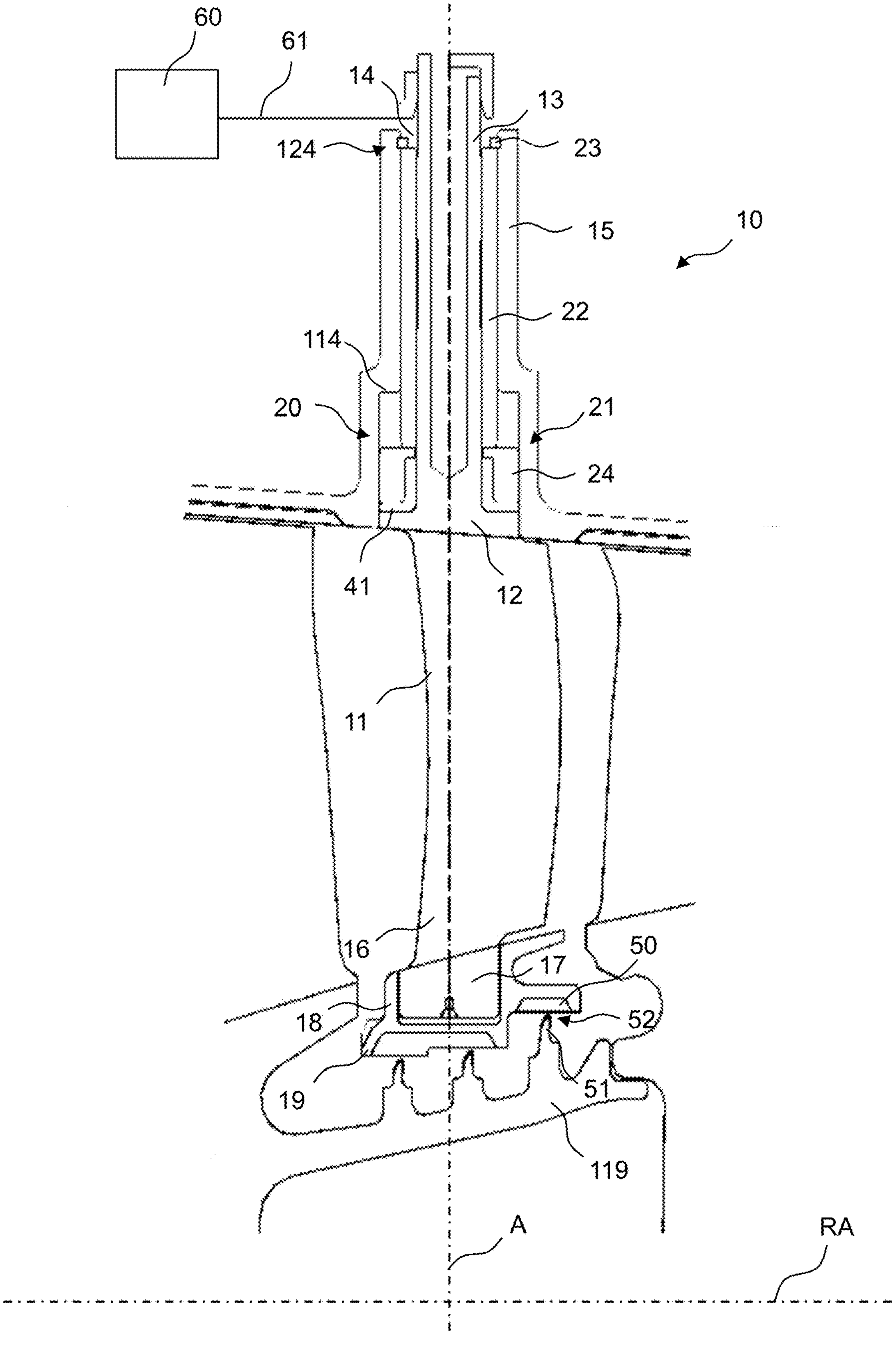
FIG. 1 is a schematic view of a first exemplary embodiment of an inventive stator vane assembly of a turbomachine.

FIG. 1 shows a first exemplary embodiment of a stator vane assembly 10 for a turbomachine, including a plurality of variable stator vanes 11 whose stator vane platform 12 has a stator vane trunnion 13 that is mounted in a receiving opening 14 of a casing 15 of the turbomachine, which receiving opening 14 is disposed radially with respect to a rotor axis RA of the turbomachine. An actuating device 60 is connected to stator vane trunnion 13 via an actuating lever 61 to rotate stator vane 11 about its pitch change axis A.

A stator vane head 16 of stator vane 11 has a bearing trunnion 17, which is mounted in a bearing seat 18 of an inner ring 19. In the embodiment shown by way of example, this inner ring 19 is undivided and extends about rotor 119 in a plane perpendicular to the plane of the drawing. On its radially inner surface facing the rotor 119 of the turbomachine, inner ring 19 is provided with a radially outer portion 50 of a sealing device 52, which, together with a second, radially inner portion 51 disposed on the radial peripheral surface of rotor 119, forms a sealing device 52.

Between stator vane platform 12 and casing 15, a first support element 21 and a second support element 22 are disposed in receiving opening 14, forming a support device 20 that supports stator vane 11 against casing 15. Support elements 21, 22 and support device 20 are configured to center stator vane 11 about its pitch change axis A in receiving opening 14.

At its radially inner end portion, receiving opening 14 has a diameter substantially equal to a diameter of stator vane platform 12, this enlarged portion of receiving opening 14 being bounded by a shoulder 114. First support element 21 is disposed in this enlarged portion of receiving opening 14 and supported by second support element 22 in the radial direction of the turbomachine.

First support element 21 has a spacer element 24, which is configured as a hollow cylinder disposed radially around stator vane trunnion 13, and which supports a hat bushing 41 with respect to stator vane platform 12. Second support element 22 is configured as a slide bushing, which is disposed in receiving opening 14 to permit varying the pitch of stator vane 11. Second support element 22, and thus also first support element 21, is secured with respect to the receiving opening the radial direction by means of a securing element 23, which is here in the form of a retaining ring. For this purpose, receiving opening 14 has a recess 124, in which securing element 23 is locked in position.

Figure 2:
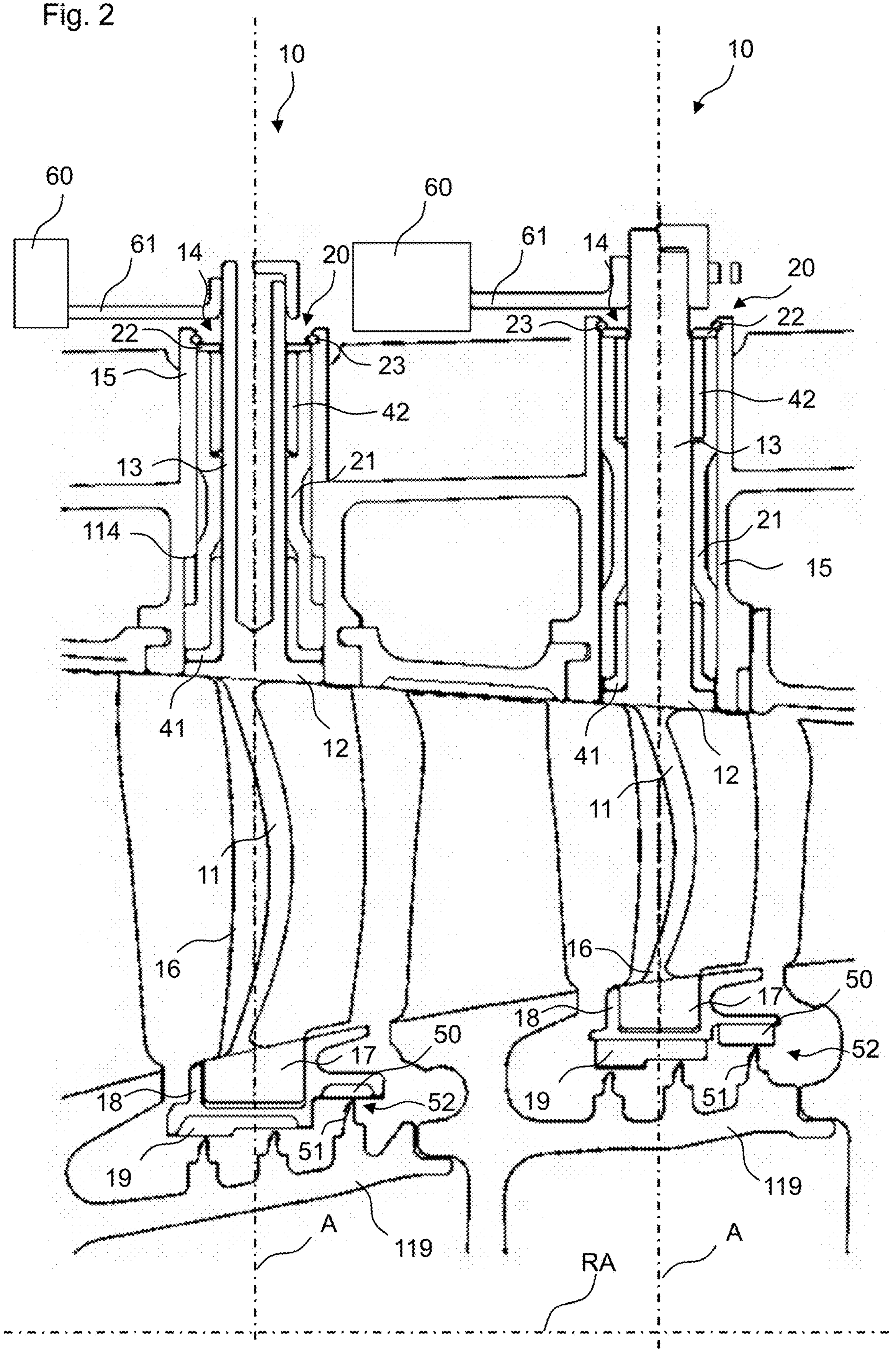
FIG. 2 is a schematic view showing two further exemplary embodiments of an inventive stator vane assembly of a turbomachine.

FIG. 2 shows two further exemplary embodiments of stator vane assemblies 10 for a turbomachine. On the left, there is shown a second exemplary embodiment, and on the right, there is shown a third exemplary embodiment of a stator vane assembly 10 as described herein. Both stator vane assemblies 10 are substantially similar to the stator vane assembly 10 shown in FIG. 1, and, therefore, only the differences will be discussed below. First, the second exemplary embodiment shown on the left will be described.

In the exemplary embodiment shown on the left, first support element 21 is in the form of a sleeve element configured to at least partially embrace stator vane trunnion 13. Sleeve element 21 is disposed in receiving opening 14 between casing 15 and stator vane trunnion 13 and is configured to support two rotary bearing bushes 41, 42 with respect to stator vane 11. The radially outer portion of sleeve element 21 (considered with respect to the turbomachine) has an enlarged receiving cross section, in which a slide bushing 42 is disposed to permit rotation of stator vane 11 about pitch change axis A. At its radially inner end, sleeve element 21 has an enlarged receiving cross section to receive a hat bushing 41 and position it with respect to stator vane platform 12. At its radially inner end, sleeve element 21 has an enlarged outer diameter, which is substantially equal to a diameter of stator vane platform 12, so that the shoulder 114 formed in receiving opening 14 may serve during assembly to prevent stator vane 11 from being positioned radially too far outward.

In the exemplary embodiment shown, second support element 22 is in the form of a ring element, which is locked in position in receiving opening 14 by means of a securing element 23. Thus, stator vane 11 can be fixed in the radial direction and, at the same time, be supported in the receiving opening.

In the third exemplary embodiment, shown on the right in FIG. 2, first support element 21 is also in the form of a sleeve element and configured to support two rotary bearing bushes 41, 42 with respect to stator vane 11 or stator vane trunnion 13 and stator vane platform 12. In contrast to the second embodiment described above, receiving opening 14 does not have a shoulder 114, but has a constant diameter over its longitudinal extent.

Figure 3:
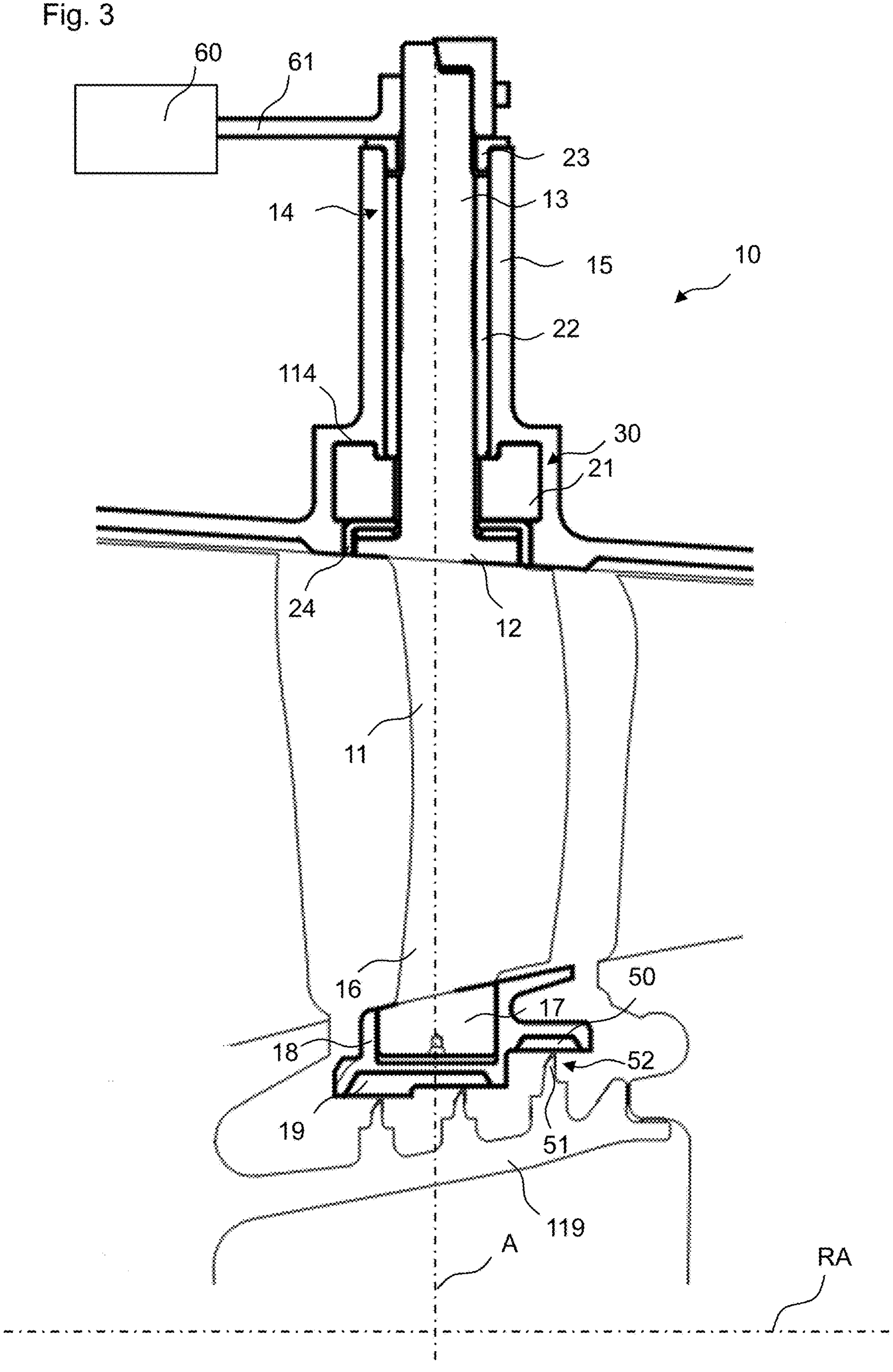
FIG. 3 is a schematic view of a stator vane assembly of a turbomachine.

FIG. 3 shows an example of a stator vane assembly 10 for a turbomachine. In the example shown, a mounting space 30 is disposed between stator vane platform 12 and casing 15, in which mounting space there is disposed a first support element 21 in such a way that it forms, together with second support element 22, a support device 20, which supports stator vane 11 against casing 15. Second support element 22 is configured as a slide bushing and disposed between stator vane trunnion 13 and casing 15 in receiving opening 14 to allow stator vane 11 to be rotated about its pitch change axis A by means of an actuating device 60.

First support element 21 is configured as a half-ring and can be inserted in a circumferential direction into the mounting space 30 formed between shoulder 114 and stator vane platform 12 in a circumferential direction of casing 15 or of the turbomachine.

Figure 4:
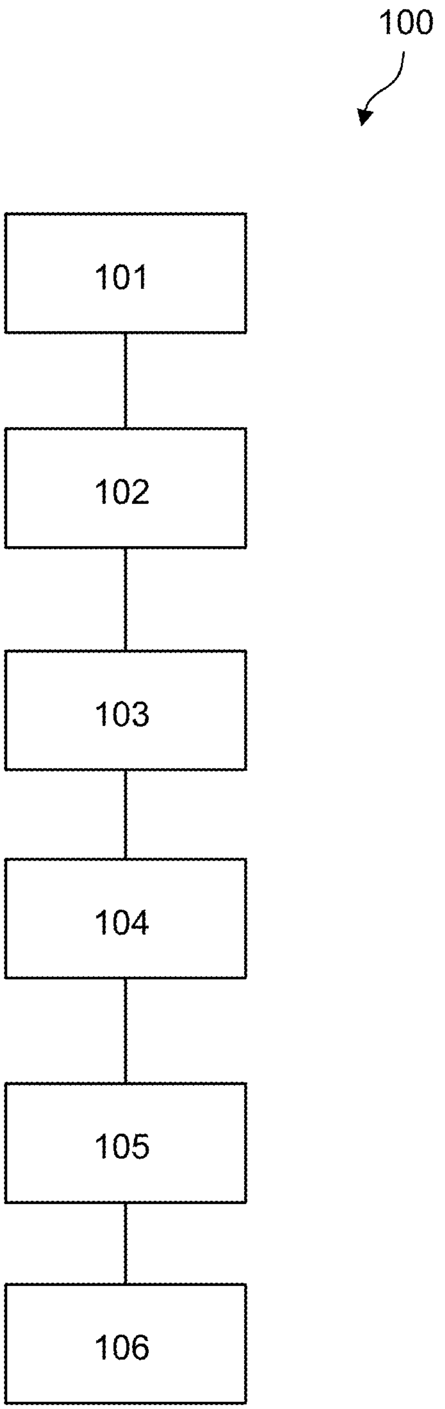
FIG. 4 is a schematic flow chart of a first exemplary embodiment of an inventive method for assembling a stator vane assembly of a turbomachine.

FIG. 4 shows a flow chart of a first exemplary method 100 for assembling a stator vane assembly 10 of a turbomachine.

In a first step 101, a first support element 21 is disposed around a stator vane trunnion 13 disposed on a stator vane platform 12 of a stator vane 11. First support element 21 may be a hollow-cylindrical element configured to position a hat bushing on stator vane platform 12. This hat bushing 41 may be disposed around stator vane trunnion 13 in a preceding step. In another exemplary embodiment, first support member 21 may be in the form of a sleeve element, in which a hat bushing 41 and a slide bushing 42 are disposed in an optional preceding step.

In a second step 102, a stator vane trunnion 13 disposed on a stator vane platform 12 of a stator vane 11 is inserted into a receiving opening 14 of a casing 15, which receiving opening 14 is disposed radially with respect to a rotor axis of the turbomachine, in particular until stator vane platform 12 abuts against casing 15. In a further step 103, an inner ring 19 is provided on a rotor 119 of the turbomachine. In a further step 104, stator vane trunnion 13 is moved out of receiving opening 14 in a radial direction toward the rotor axis until a bearing trunnion 17 disposed on a stator vane head 16 of stator vane 11 engages in a bearing seat 18 disposed on inner ring 19. The movement of stator vane trunnion 13 out of receiving opening 14 may be effected from a radially outer portion of receiving opening 14 using a tool. The movement of stator vane trunnion 13 into and out of receiving opening 14 is effected along a pitch change axis A of stator vane 11 disposed radially with respect to a rotor axis of the turbomachine.

In a further step 105, a second support element 22 is disposed or placed in receiving opening 14 such that stator vane 11 is supported against casing 15 in the radial direction of the turbomachine. The disposition of second support element 22 may be effected from a radially outer portion of the receiving opening.

In a further optional step, in some exemplary embodiments of the proposed method 100, a securing element 23 may be disposed to lock first and/or second support elements 21, 22 in position. In a further step 106, stator vane trunnion 13 is connected to an actuating device 60, in particular via an actuating lever 61, to allow stator vane 11 to be rotated about its pitch change axis A.

FIGS. 5*a* through 5*g* illustrate exemplary steps of a method 100 for assembling a stator vane assembly 10 of a turbomachine.

Figure 5A:
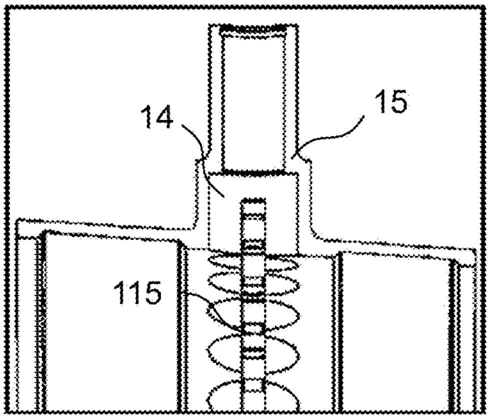
FIGS. 5*a* through 5*g* are schematic views of a sequence of the first exemplary embodiment of an inventive method from FIG. 4 for assembling a stator vane assembly of a turbomachine.
Figure 5B:
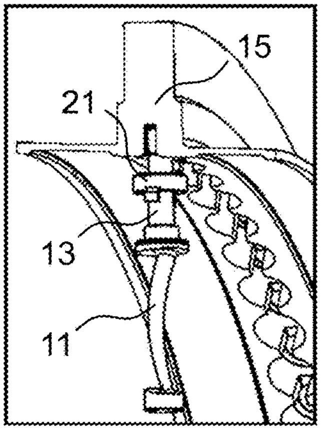
Figure 5C:
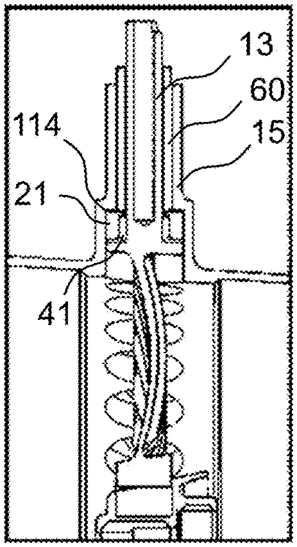

In a first optional step, shown in FIG. 5*a*, a casing 15 for a stator vane assembly 10 of a turbomachine is provided. Casing 15 has a plurality of receiving openings 14 extending radially with respect to an axis of rotation of the turbomachine. Two each of the receiving openings 14 are interconnected at their radially inner portions by a connecting opening 115. FIG. 5*b* illustrates step 101 from FIG. 4, in which a first support element 21 is disposed around a stator vane trunnion 13 of a stator vane 11. FIG. 5*c* shows a stator vane 11 in an inserted position, in which first support element 21 rests against a shoulder 114 formed in receiving opening 14. A tool 70 may be placed in the space formed between stator vane trunnion 13 and casing 15 to allow stator vane 11 to be moved out of receiving opening 14 through an in particular predetermined distance and positioned on the inner ring.

Figure 5D:
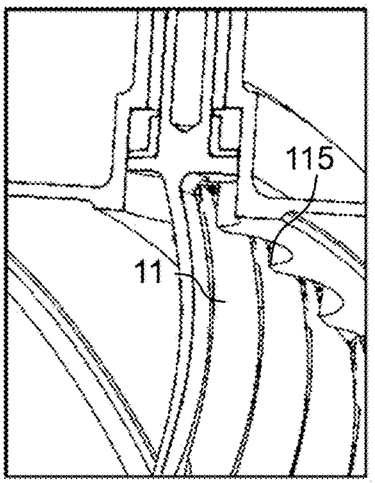

FIG. 5*d* shows another view depicting stator vane 11 in a fully inserted state. It can be seen that the airfoils of stator vanes 11 are oriented in a circumferential direction of casing 15, so that they can be received in connecting openings 115, making it possible to gain space for the disposition of inner ring 19 and to facilitate assembly.

Figure 5E:
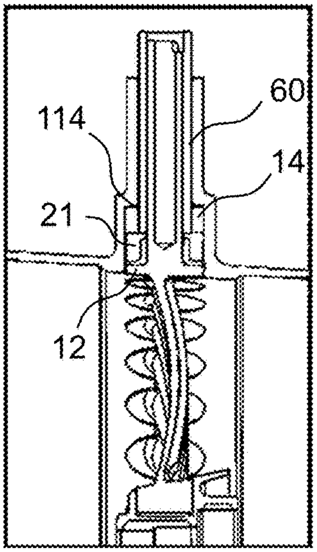

FIG. 5*e* shows stator blade 11 after it was moved out of receiving opening 14 by means of tool 70 in a step 104. In this condition, first support element 21 is spaced apart from shoulder 114 of receiving opening 14, and stator vane platform 12 is flush with a radially inner edge of casing 15.

Figure 5F:
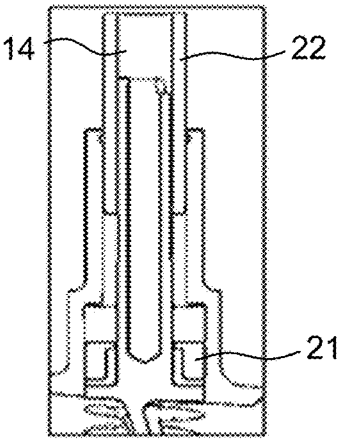
Figure 5G:
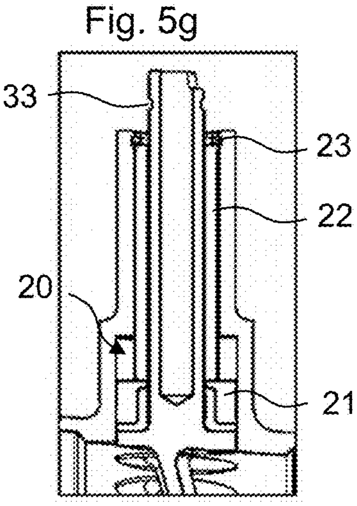

FIG. 5*f* shows a step 105, in which a second support element 22 in the form of a slide bushing is received in a radially outer portion of receiving opening 14. FIG. 5*g* shows a support device 20 which is made up by first and second support elements 21, 22 and which is locked in position by a securing element 23 disposed in receiving opening 14 in order to support second support element 22, and thus also first support element 21, against casing 15 in the radial direction of the turbomachine and hold it in position. Further, a mounting groove 33 is provided on stator vane trunnion 13 in the portion thereof facing away from stator vane platform 12, which mounting groove 33 may serve as a contact point for an assembly and/or disassembly of the stator vane assembly in order to facilitate movement of stator vane 11 in receiving opening 14.

Figure 6:
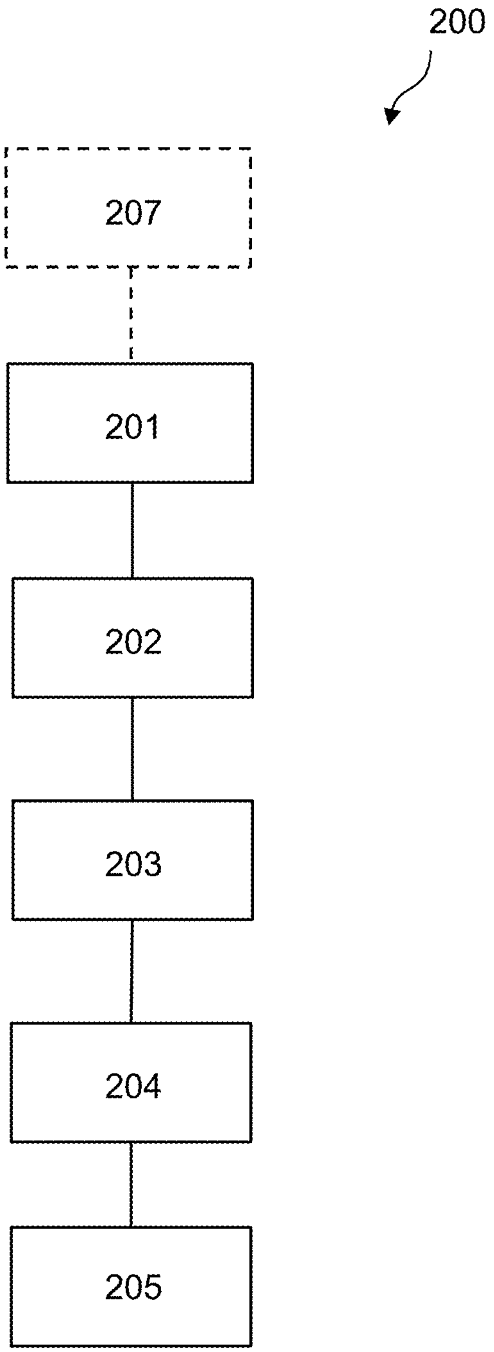
FIG. 6 is a schematic flow chart of an exemplary embodiment of a method for assembling a stator vane assembly of a turbomachine of FIG. 3.
Figure 7A:
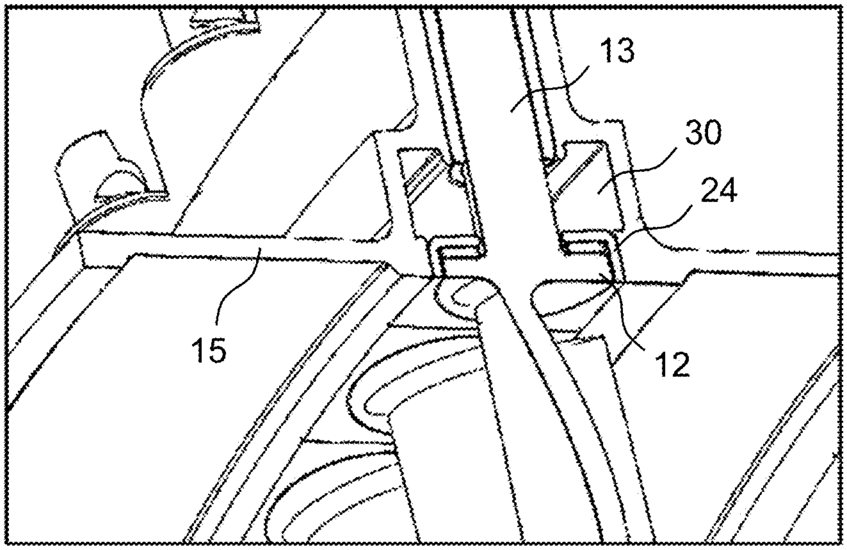
FIGS. 7*a* through 7*b* are schematic views of a sequence of the method from FIG. 6 for assembling a stator vane assembly of a turbomachine.
Figure 7B:
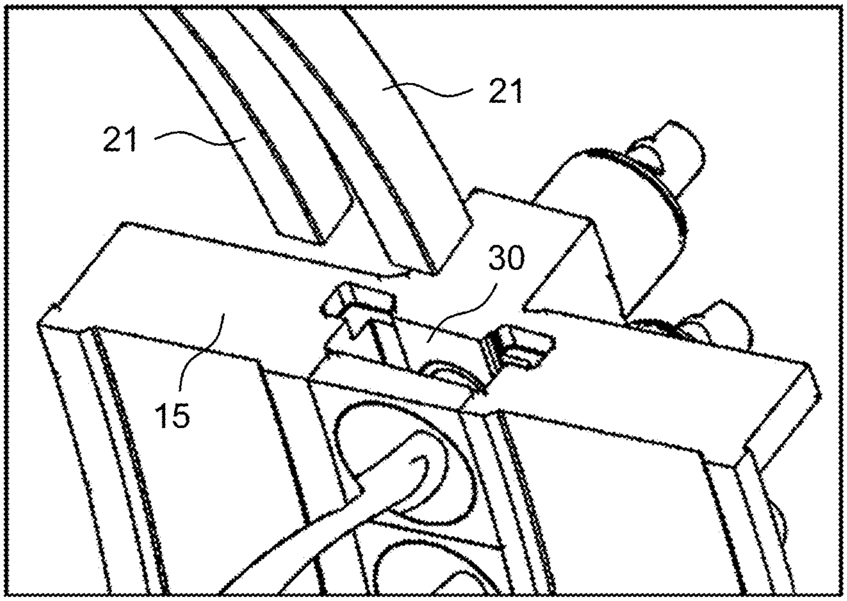

FIG. 6 shows a flow chart of an exemplary method 200 for assembling a stator vane assembly 10, shown in FIGS. 7*a* and 7*b*, of a turbomachine.

In a first step 201, a stator vane trunnion 13 disposed on a stator vane platform 12 of a stator vane 11 is inserted into a receiving opening 14 of a casing 15, which receiving opening 14 is disposed radially with respect to a rotor axis of the turbomachine, in particular until stator vane platform 12 rests against casing 15. In an optional step 207, a support element 21 and/or a rotary bearing bush 41, 42 (see FIG. 2) may previously be disposed around or provided at stator vane trunnion 13 or stator vane platform 12.

In a step 202, an inner ring 19 is provided on a rotor 119 of the turbomachine, and in a further step 203, stator vane trunnion 13 is moved out of receiving opening 14 radially toward a rotor axis RA of the turbomachine until a bearing trunnion 17 disposed on a stator vane head 16 of stator vane 11 engages in a bearing seat 18 disposed on inner ring 19; stator vane platform 12 and casing 15 together forming a mounting space 30, which is formed in casing 15 continuously circumferentially or continuously in the circumferential direction.

In a step 204, a first support element 21 is disposed in mounting space 30 to support stator vane 11 with respect to casing 15. In the process, first support element 21 is inserted into mounting space 30 in a circumferential direction of casing 15 or of the turbomachine. In a further step 205, stator vane trunnion 13 is connected to an actuating device 60, in particular via an actuating lever 61, to allow stator vane 11 to be rotated about its pitch change axis A. In this step 205, support device 20 is secured or locked in position, in particular by means of a securing element 23.

The method may include a further step of disposing a spacer element 24 around stator vane trunnion 13 or stator vane platform 12 of stator vane 11. In this case, first a hat bushing 41 or thrust washer may be inserted into spacer element 24 or disposed around stator vane trunnion 13 prior to disposing spacer element 24 on stator vane trunnion 13 or stator vane platform 12 and inserting stator vane trunnion 13 into receiving opening 14 of casing 15. Thus, spacer element 24 can be made available so as to be moved to an end position in a further step in order to support stator vane(s) 11 against each other or against casing 15. Spacer element 24 is configured in particular such that, together with stator vane platform 12, it closes receiving opening 14 in a direction toward rotor 119. The opening of casing 15, which in particular forms an opening of mounting space 30, and/or mounting space 30 may be formed circumferentially or continuously on casing 15 and may in particular be closed circumferentially or continuously by means of stator vane platforms 12 and spacer elements 24.

FIGS. 7*a* and 7*b* are schematic illustrations of steps of the method 200 described above with reference to FIG. 6 for assembling a stator vane assembly 10 of a turbomachine.

FIG. 7*a* shows how, in step 203, mounting space 30 is formed between casing 15 and stator vane platform 12 or the spacer element 24 surrounding stator vane platform 12, the mounting space 30 being formed in casing 15 continuously circumferentially or continuously in the circumferential direction.

FIG. 7*b* illustrates step 204, in which two first support elements 21 are inserted into mounting space 30 in the circumferential direction of casing 15. It can be seen in the illustration that the first two support elements 21 are disposed adjacent to stator vane trunnion(s) 13 on both sides in the axial direction of the turbomachine so as to support the stator vane(s).

Figure 8A:
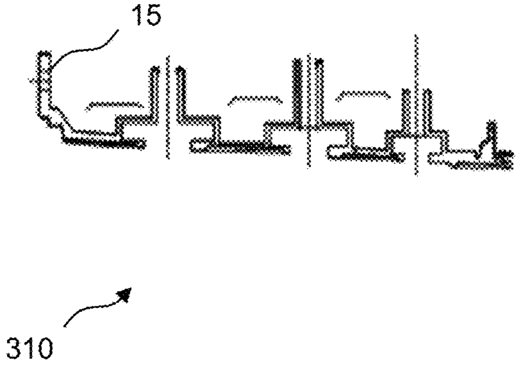
FIG. 8*a* through FIG. 8*f* are schematic views illustrating an embodiment of an inventive method for assembling a flow assembly of a turbomachine.
Figure 8B:
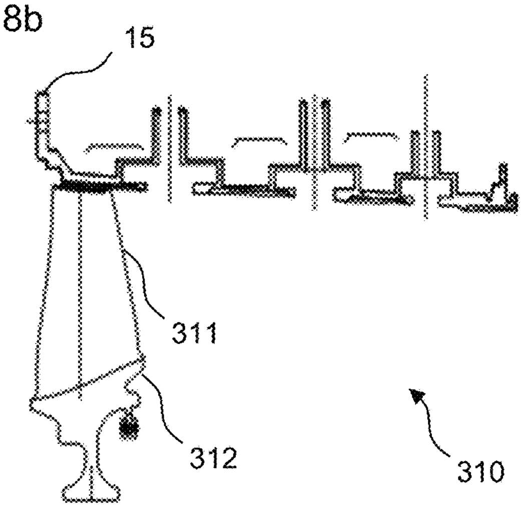
Figure 8C:
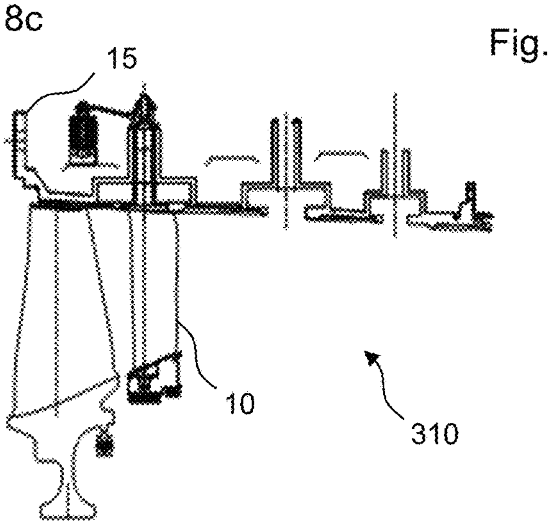

FIG. 8*a* through FIG. 8*f* schematically illustrate steps of an exemplary embodiment of a method 300 for assembling a flow assembly 310 of a turbomachine. FIG. 8*a* shows a step of providing a casing 15. FIG. 8*b* illustrates the disposition of a first rotor blade assembly 311 having a first rotor portion 312 in casing 15. FIG. 8*c* shows the mounting of a first stator vane assembly 10 in casing 15 in accordance with a method 100 as described herein. In the process, a divided or undivided inner ring 19 is placed into the available installation space of the turbomachine, whereupon stator vanes 11 of stator vane assembly 10 can be mounted thereon. In contrast to known methods, the proposed method in particular eliminates the need to assemble a plurality of inner ring components, thereby simplifying the assembly of flow assembly 310.

Figure 8D:
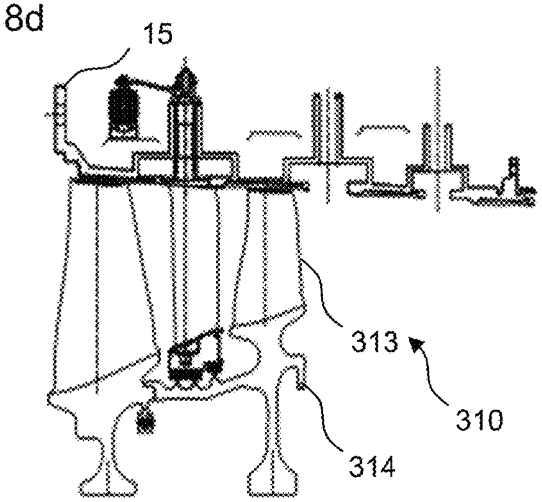
Figure 8E:
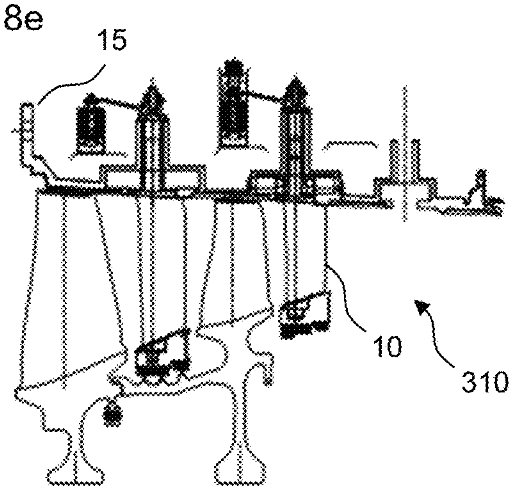
Figure 8F:
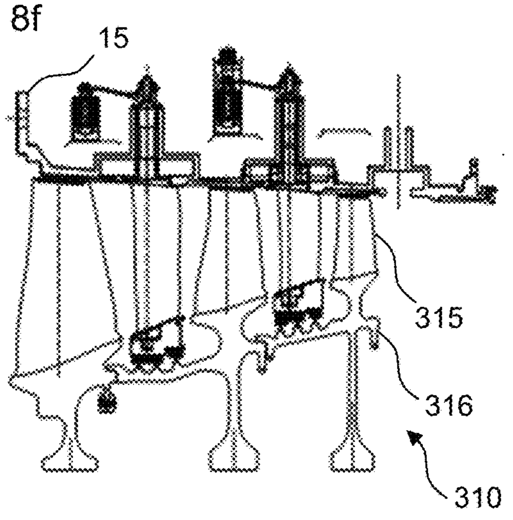

FIG. 8*d* shows the disposition of a second rotor blade assembly 313 having a second rotor portion 314 in casing 15, and FIG. 8*e* shows the mounting of a second stator vane assembly 10 in casing 15 in accordance with the proposed method 100. FIG. 8*f* illustrates the disposition of a third rotor blade assembly 315 having a second rotor portion 316 in casing

| LIST OF REFERENCE CHARACTERS | |
|---|---|
| 10 | stator vane assembly |
| 11 | stator vane |
| 12 | stator vane platform |
| 13 | stator vane trunnion |
| 14 | receiving opening |
| 15 | casing |
| 16 | stator vane head |
| 17 | bearing trunnion |
| 18 | bearing seat |
| 19 | inner ring |
| 20 | support device |
| 21 | first support element |
| 22 | second support element |
| 23 | securing element |
| 24 | spacer element |
| 25 | mounting space |
| 33 | mounting groove |
| 41 | hat bushing |
| 42 | slide bushing |
| 50, 51 | portion of a sealing device |
| 52 | sealing device |
| 60 | actuating device |
| 61 | actuating lever |
| 100 | method |
| 101-106 | method steps |
| 114 | shoulder in the receiving opening |
| 115 | connecting opening |
| 119 | rotor |
| 124 | recess |
| 200 | method |
| 201-207 | method steps |
| 300 | method |
| 310 | flow assembly |
| 311 | first rotor blade assembly |
| 312 | first rotor portion |
| 313 | second rotor blade assembly |
| 314 | second rotor portion |
| 315 | third rotor blade assembly |
| 316 | third rotor portion |
| A | pitch change axis |
| RA | rotor axis |

What is claimed is:

1. A stator vane assembly of a turbomachine, the stator vane assembly comprising:

a plurality of variable stator vanes, each stator vane having: a stator vane platform having a stator vane trunnion mounted in a receiving opening of a casing of the turbomachine, and a stator vane head having a bearing trunnion mounted on an inner ring configured to engage with a rotor of the turbomachine; and a respective support device for supporting each stator vane radially against the casing with respect to a rotor axis of the turbomachine, the respective support device disposed in the receiving opening and including, at least one first support element and at least one second support element, the second support element supporting the first support element radially against the casing within the receiving opening with respect to the rotor axis of the turbomachine.

2. The stator vane assembly as recited in claim 1 wherein the inner ring is a single piece or segmented.

3. The stator vane assembly as recited in claim 1 wherein the support device is configured to center a pitch change axis of the stator vane in the receiving opening.

4. The stator vane assembly as recited in claim 1 wherein the receiving opening is circular in shape at a radially inner end portion having a diameter equal to a diameter of the stator vane platform.

5. The stator vane assembly as recited in claim 1 wherein at least two adjacent receiving openings are interconnected at radially inner portions by a connecting opening in such a way that a portion of the stator vane is receivable in the connecting opening.

6. The stator vane assembly as recited in claim 1 wherein the respective support device is configured to support at least one rotary bearing bush for the stator vane.

7. The stator vane assembly as recited in claim 1 wherein the respective support device is locked in position in the receiving opening of the casing by a securing element.

8. The stator vane assembly as recited in claim 1 wherein the stator vane trunnion has a mounting groove in a portion opposite the stator vane platform.

9. The stator vane assembly as recited in claim 1 wherein the second support element is a slide bushing for the stator vane trunnion.

10. The stator vane assembly as recited in claim 1 wherein the first support element has at least one spacer element configured to support at least one hat bushing for the stator vane platform.

11. The stator vane assembly as recited in claim 1 wherein the first support element is a sleeve element configured to at least partially embrace the stator vane trunnion.

12. The stator vane assembly as recited in claim 11 wherein the sleeve element is configured to support two rotary bearing bushes with respect to the stator vane.

13. The stator vane assembly as recited in claim 11 wherein the second support element is locked in position in the receiving opening of the casing by a retainer.

14. The stator vane assembly as recited in claim 1 wherein the inner ring is configured as a half-ring.

15. The stator vane assembly as recited in claim 1 wherein the first support element includes a hat bushing.

16. The stator vane assembly as recited in claim 15 wherein the first support element has a spacer ring spacing the hat bushing from the second support element.

17. The stator vane assembly as recited in claim 15 wherein the second support element includes a slide bushing and the hat bushing has a maximum outer diameter larger than that of the slide bushing.

18. The stator vane assembly as recited in claim 17 wherein the first support element has a spacer ring spacing the hat bushing from the slide bushing, the spacer ring having a same maximum outer diameter as that of the hat bushing.

19. A turbomachine comprising at least one stator vane assembly as recited in claim 1.

* * * * *